(12) United States Patent
Benhase et al.

(10) Patent No.: US 9,081,511 B2
(45) Date of Patent: *Jul. 14, 2015

(54) SOURCE-TARGET RELATIONS MAPPING

(75) Inventors: Michael T. Benhase, Tucson, AZ (US);
Theresa M. Brown, Tucson, AZ (US);
Lokesh M. Gupta, Tucson, AZ (US);
Carol S. Mellgren, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 698 days.

This patent is subject to a terminal disclaimer.

(21) Appl. No.: 13/033,431

(22) Filed: Feb. 23, 2011

(65) Prior Publication Data

US 2012/0216009 A1 Aug. 23, 2012

(51) Int. Cl.
*G06F 12/00* (2006.01)
*G06F 3/06* (2006.01)
*G06F 12/10* (2006.01)

(52) U.S. Cl.
CPC ............ *G06F 3/0655* (2013.01); *G06F 3/0604* (2013.01); *G06F 3/0605* (2013.01); *G06F 3/065* (2013.01); *G06F 3/067* (2013.01); *G06F 12/1036* (2013.01)

(58) Field of Classification Search
CPC ...... G06F 3/065; G06F 3/067; G06F 11/1448
See application file for complete search history.

(56) References Cited

U.S. PATENT DOCUMENTS 7,647,456 B2 * 1/2010 Wolfgang et al. ............. 711/154
7,707,372 B1 * 4/2010 Kumar et al. ................. 711/162

(Continued)

OTHER PUBLICATIONS

"Deduplication", Wikipedia, [online] [retrieved Jan. 10, 2011] http://en.wikipedia.org/wiki/Deduplication, p. 1.

(Continued)

*Primary Examiner* — Baboucarr Faal
(74) *Attorney, Agent, or Firm* — William K. Konrad; Konrad Raynes Davda & Victor LLP

(57) ABSTRACT

A data preservation function is provided which, in one embodiment, includes mapping in a plurality of maps for a target storage device, map extent ranges of each map, to corresponding target extent ranges of storage locations on the target storage device. Usage of a particular map extent range by a relationship between a source extent range of storage locations on a source storage device containing data to be preserved in the source extent range, and the target extent range mapped to the map particular extent range, may be indicated by the map. In another aspect, in response to receipt of a data preservation command, a data preservation operation is performed including determining whether a map indicates availability of a map extent range mapped to the identified target extent range. Upon determining that a particular map indicates availability of a map extent range mapped to the identified target extent range, a relationship between the identified source extent range and the identified target extent range is established. In yet another aspect, upon determining that no map indicates availability of a map extent range mapped to the identified target extent range, establishing of a relationship between the identified source extent range and the identified target extent range may be delayed until it is determined that a particular map indicates availability of a map extent range mapped to the identified target extent range. Other features and aspects may be realized, depending upon the particular application.

8 Claims, 8 Drawing Sheets

| RELATIONSHIP EVENT | RELATIONSHIP (TRACKS) | BIT MAP |
|---|---|---|
| R1 | S→T1 (0-50) | BM1 |
| R2 | S→T1 (51-100) | BM1 |
| R3 | S→T1 (100-101) | BM1 |
| WITHDRAW | S X T1 (0-50) | BM1 |
| R4 | S→T1 (0-20) | BM2 |
| R5 | S→T1 (21-40) | BM2 |
| WITHDRAW | S X T1 (51-150) | BM1 |
| R6 | S→T1 (41-130) | BM2 |
| R7 | S→T1 (131-150) | BM2 |
| WITHDRAW | S X T1 (0-150) | BM2 |
| R8 | S→T1 (full volume) | BM3 |
| WITHDRAW | S X T1 (full volume) | BM3 |
| R9 | S→T1 (0-40) | BM4 |
| R10 | S→T1 (41-60) | BM4 |
| R11 | S→T1 (61-140) | BM4 |
| R12 | S→T1 (141-150) | BM4 |
| WITHDRAW | S X T1 (0-150) | BM4 |
| R13 | S→T1 (0-75) | BM5 |
| R14 | S→T1 (76-150) | BM5 |
| WITHDRAW | S→T1 (0-150) | BM5 |
| R15 | S→T1 (0-100) | — |
| R15 | S→T1 (0-100) | BM1 |

(56) References Cited

U.S. PATENT DOCUMENTS

| | | |
|---|---|---|
| 2008/0183988 A1* | 7/2008 | Qi .................................. 711/162 |
| 2009/0089483 A1 | 4/2009 | Tanaka et al. |
| 2010/0082558 A1 | 4/2010 | Anglin et al. |
| 2010/0088277 A1 | 4/2010 | Rao et al. |
| 2010/0088349 A1 | 4/2010 | Parab |
| 2010/0131466 A1* | 5/2010 | Chen ............................. 707/615 |
| 2010/0131480 A1 | 5/2010 | Schneider |
| 2010/0174881 A1 | 7/2010 | Anglin et al. |
| 2010/0199065 A1 | 8/2010 | Kaneda |
| 2010/0205389 A1 | 8/2010 | Kishi |
| 2010/0235333 A1 | 9/2010 | Bates et al. |

OTHER PUBLICATIONS

"Data deduplication", Wikipedia, [online] [retrieved Jan. 10, 2011] http://en.wikipedia.org/wiki/Data_deduplication, p. 1.

"DFSMS Advanced Copy Services", IBM Corporation, Document No. SC35-0428-14, Sep. 2008, Part 5 Flash Copy, pp. 433-482.

"DFSMS Advanced Copy Services", IBM Corporation, Document No. SC35-0428-14, Sep. 2008, section 1, pp. 1-213.

"DFSMS Advanced Copy Services", IBM Corporation, Document No. SC35-0428-14, Sep. 2008, section 2, pp. 214-392.

"DFSMS Advanced Copy Services", IBM Corporation, Document No. SC35-0428-14, Sep. 2008, section 3, pp. 393-578.

"DFSMS Advanced Copy Services", IBM Corporation, Document No. SC35-0428-14, Sep. 2008, section 4, pp. 579-708.

U.S. Appl. No. 13/774,959, filed Feb. 22, 2013, inventors M.T. Benhase, et al.

Preliminary Remarks filed Feb. 22, 2013 for U.S. Appl. No. 13/774,959, filed Feb. 22, 2013, inventors M.T. Benhase, et al.

Office Action dated Sep. 13, 2013, pp. 13, for U.S. Appl. No. 13/774,959, filed Feb. 22, 2013.

Response dated Dec. 12, 2013, pp. 8, to Office Action dated Sep. 13, 2013, pp. 13, for U.S. Appl. No. 13/774,959, filed Feb. 22, 2013.

Final Office Action dated Feb. 13, 2014, pp. 15, for U.S. Appl. No. 13/774,959, filed Feb. 22, 2013.

Response dated Apr. 14, 2014, p. 7, to Final Office Action dated Feb. 13, 2014, pp. 15, for U.S. Appl. No. 13/774,959, filed Feb. 22, 2013.

Final Office Action dated Dec. 12, 2014, pp. 12, for U.S. Appl. No. 13/774,959, filed Feb. 22, 2013.

Response dated Feb. 24, 2015, pp. 5, to Final Office Action dated Dec. 24, 2014, pp. 12, for U.S. Appl. No. 13/774,959, filed Feb. 22, 2013.

Notice of Allowance dated Mar. 11, 2015, pp. 11, for U.S. Appl. No. 13/774,959, filed Feb. 22, 2013.

* cited by examiner

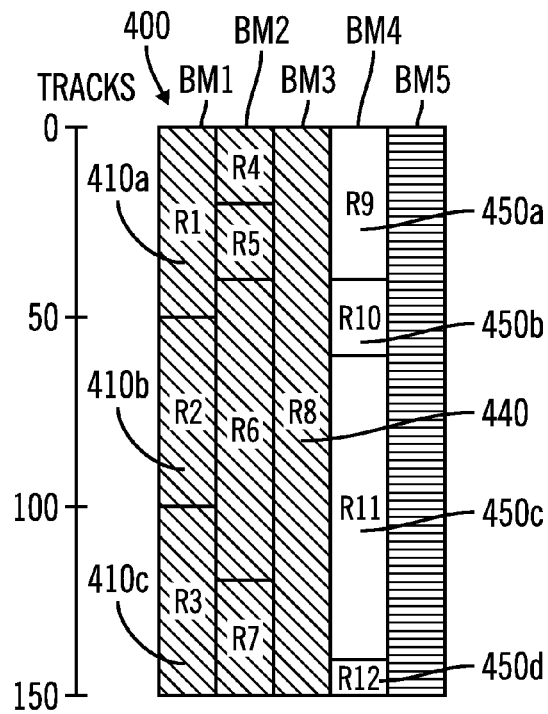
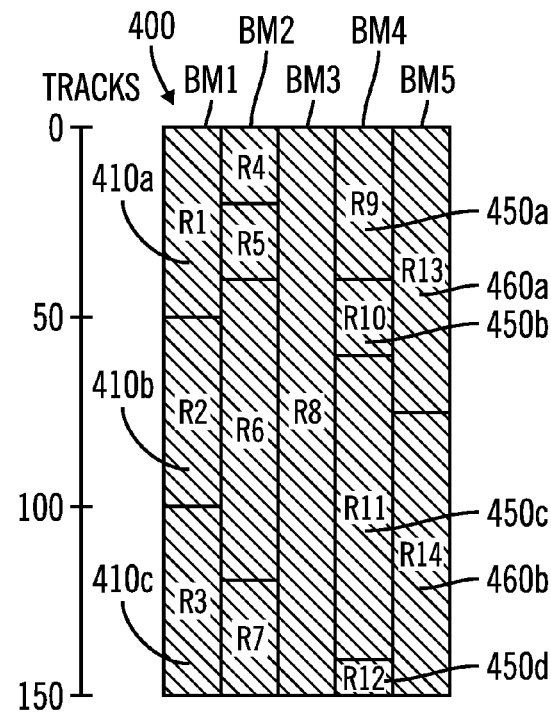
FIG. 4E
FIG. 4F
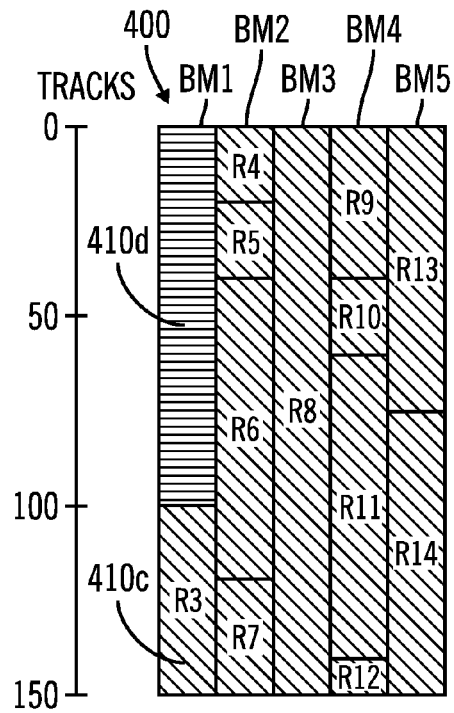
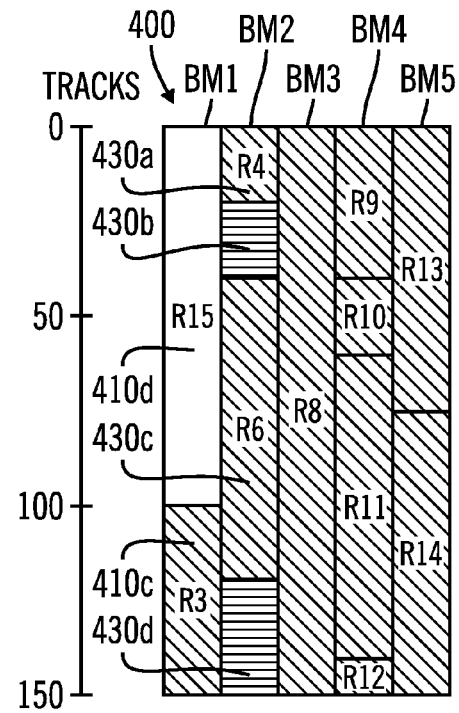
FIG. 4G
FIG. 4H

| RELATIONSHIP EVENT | RELATIONSHIP (TRACKS) | BIT MAP |
|---|---|---|
| R1 | S→T1 (0-50) | BM1 |
| R2 | S→T1 (51-100) | BM1 |
| R3 | S→T1 (100-101) | BM1 |
| WITHDRAW | S X T1 (0-50) | BM1 |
| R4 | S→T1 (0-20) | BM2 |
| R5 | S→T1 (21-40) | BM2 |
| WITHDRAW | S X T1 (51-150) | BM1 |
| R6 | S→T1 (41-130) | BM2 |
| R7 | S→T1 (131-150) | BM2 |
| WITHDRAW | S X T1 (0-150) | BM2 |
| R8 | S→T1 (full volume) | BM3 |
| WITHDRAW | S X T1 (full volume) | BM3 |
| R9 | S→T1 (0-40) | BM4 |
| R10 | S→T1 (41-60) | BM4 |
| R11 | S→T1 (61-140) | BM4 |
| R12 | S→T1 (141-150) | BM4 |
| WITHDRAW | S X T1 (0-150) | BM4 |
| R13 | S→T1 (0-75) | BM5 |
| R14 | S→T1 (76-150) | BM5 |
| WITHDRAW | S→T1 (0-150) | BM5 |
| R15 | S→T1 (0-100) | — |
| R15 | S→T1 (0-100) | BM1 |
| | | |

FIG. 5

SOURCE-TARGET RELATIONS MAPPING

BACKGROUND

1. Field

The present description relates to a method, system, and computer program for mapping source-target relationships in a storage area network.

2. Description of Related Art

One or more hosts may store large quantities of data in a group of storage units, which is typically controlled by a storage controller. An example of such a storage controller is the IBM TotalStorage® Enterprise Storage Server® (ESS). A storage controller such as the ESS may provide a number of functions accessible by the hosts for protecting data, backing up the data, and making the data available for use.

Amongst the functions which may be provided by a storage controller is a data preservation function which can preserve an identified set of data at a particular point in time. For example, the ESS storage controller supports a data preservation function referred to as "FlashCopy" which enables a copy to be made of a set of tracks in a source volume. One feature of such data preservation functions is that the data of the copy is frequently made immediately available for read or write access. The identified data may be for example, a set of tracks which can consist of an entire volume, a data set, or just a selected set of tracks, for example.

In one mode of a data preservation function, a copy of all of the data to be preserved at the particular point in time, is made by copying the identified data from identified tracks of the source volume to identified tracks of the target volume, typically in a background copy mode. In this manner, a relationship is established between those identified tracks on the source volume and corresponding tracks on the target volume, in response to a data preservation request. The data preservation relationship may be initiated in response to the data preservation request and may be terminated and deleted when the background copy completes or in response to a withdrawal command.

However, for some data storage operations, copying all of the data to be preserved at a point in time may not be suitable. For example, some storage units are configured for improved data storage efficiency. Examples of efficiency configurations include the "Track Space Efficient" and "Extent Space Efficient" volume configurations often used in ESS data storage systems. A track "extent" typically contains a beginning track, an ending track, and all the tracks between the beginning track and the end track.

In such volume efficiency configurations, a different mode of operation may be used for a data preservation function. For example, instead of copying all of the data to be preserved at a point in time, a "block on write" paradigm may be followed.

As noted above, the data preservation relationship may be initiated in response to a data preservation request and may end when the background copy completes or in response to a withdrawal command. There are various reasons for withdrawing a FlashCopy relationship. For example, there might no longer be a need for the FlashCopy relationship. In those and other situations, the withdrawal command may be used to delete the relationship between the source and target.

In many prior storage systems, a relationship may be deleted or removed immediately in response to a withdrawal command. Hence, a new relationship which encompasses tracks of a prior relationship may frequently be rapidly established in such systems following a withdrawal command of the prior relationship.

SUMMARY

A data preservation function is provided which, in one embodiment, includes mapping in a plurality of maps for a target storage device, map extent ranges of each map, to corresponding target extent ranges of storage locations on a target storage device. Indicated for a particular map extent range of a particular map, is usage of the particular map extent range by a relationship between a source extent range of storage locations on a source storage device containing data to be preserved in the source extent range, and the target extent range mapped to the map particular extent range.

In another aspect, in response to receipt of a data preservation command for an identified source extent range containing data to be preserved on the source storage device, and an identified target extent range on the target storage device, a data preservation operation may be performed including determining whether a map indicates availability of a map extent range mapped to the identified target extent range. Upon determining that a particular map indicates availability of a map extent range mapped to the identified target extent range, a relationship between the identified source extent range and the identified target extent range is established. In addition, usage of the particular map extent range of the particular map by the relationship may be indicated by the map.

In one embodiment, an identification of the particular map may be stored in a data structure for the relationship, such that the data structure can indicate usage of the particular map extent range of the particular map by the relationship.

In another aspect, upon determining that no map indicates availability of a map extent range mapped to the identified target extent range, establishing of a relationship between the identified source extent range and the identified target extent range may be delayed until it is determined that a particular map indicates availability of a map extent range mapped to the identified target extent range.

In some embodiments, upon withdrawing a relationship, data within the identified target extent range of the withdrawn relationship, may be copied to older relationships inheriting the data being copied. Upon completion of the copying of data within the identified target extent range of the withdrawn relationship, to older relationships inheriting the data being copied, it may be indicated that the particular map extent range of the particular map, is available for usage by another relationship between a source extent range of storage locations on a source storage device containing data to be preserved in the source extent range, and the target extent range of the withdrawn relationship.

Other features and aspects may be realized, depending upon the particular application.

BRIEF DESCRIPTION OF THE DRAWINGS

FIGS. 4a-4h illustrate examples of a table of bitmaps in connection with operations of a data preservation function in accordance with one embodiment of the present description.

FIG. 5 illustrates examples of events in connection with operations of a data preservation function in accordance with one embodiment of the present description.

DETAILED DESCRIPTION

It is appreciated that there may be storage systems in which there can be delays in completing the deletion of a relationship in response to a withdrawal command. For example, data may need to be copied from the target before the relationship is permitted to be deleted or removed in response to withdrawal of that relationship. As a consequence, in some systems, establishment of a new relationship which encompasses tracks of a prior relationship may be delayed until withdrawal of the prior relationship is completed and the prior relationship is deleted.

In accordance with one aspect of the present description, and as explained in greater detail below, by providing a plurality of maps for a target storage device, in which each map, maps extent ranges of the map to corresponding target extent ranges of storage locations on the target storage device, a new relationship which encompasses tracks of a prior relationship may be initiated before deletion of the withdrawn prior relationship is completed. As a consequence, reduction or elimination of delays in establishing of new relationships may be facilitated.

Figure 1:
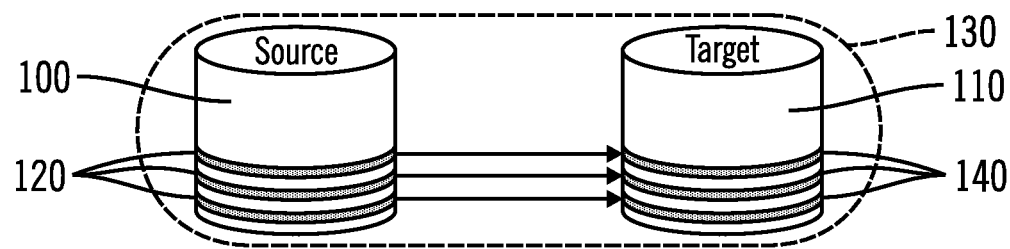
FIG. 1 illustrates operations of a prior art data preservation function in an "all copy" mode of operation.

FIG. 1 illustrates one example of one mode of operation of a prior art data preservation function, referred to herein as an "all copy" mode, in which a copy of all of the data to be preserved at a point in time, is made by copying the identified "point-in-time" data from a source volume 100 to a target volume 110, typically in a background copy mode. The source volume 100 and the target volume 110, as well as the set of data to be preserved, are typically identified in a data preservation request.

The point-in-time data to be preserved on the source volume 100 resides on particular tracks, indicated at 120 in FIG. 1. In one prior art device, a relationship 130 is established between those identified tracks 120 on the source volume 100 and corresponding tracks 140 on the target volume 140, in response to a data preservation request. The source tracks 120 for the point-in-time data to be preserved may reside in one or more track extents, each of which contains a beginning track, an ending track, and all the tracks between the beginning track and the end track.

In one prior art device, a contiguous set of source tracks related to a contiguous set of target tracks is referred to as a "track set." Each track set provides a data preservation relationship 130. In some prior art devices, a track set is described in terms of a source track extent and a target track extent. Thus one or more tracks may be identified to be preserved but each track set may require a source extent and a target extent in some prior art devices. The data preservation relationship 130 begins in response to a data preservation request and ends when the background copy completes or in response to a withdrawal command.

As previously mentioned, in the "all copy" mode of the data preservation function depicted in FIG. 1, all tracks in the relationship 130 are physically copied from the source volume tracks 120 to the target volume tracks 140. In some prior art devices, the source tracks 120 are copied to the target volume 110 in the same track locations within the target volume 110 as the source tracks 120 within the source volume 100. In other prior devices, source tracks 120 may be copied to the target volume 110 in track locations specified in the data preservation function request.

As soon as the relationship 130 is established, user programs have access to two logical copies of the source data. Access to the point-in-time copy of the data on the source volume 100 is through reading the data from the target volume 110. Data that is read from the target storage device returns source track data from the point-in-time of the establishment of the "all copy" mode relationship 130. Access to the point-in-time data is provided without waiting for the copying of the point-in-time data to the target storage device to complete. If the point-in-time data requested from the target storage device has not yet been physically copied to the target volume 110, the point-in-time data is obtained from the source volume 100.

The data preservation relationship 130 ends for each track set when it is copied to the target volume 110. After the background copy is complete, the point-in-time data on the target storage device is the same as the point-in-time data on the source storage device when the data preservation relationship 130 was first established. However, if data is written to a track that is a target track that was in the data preservation relationship 130, a read to the updated target track returns the user-updated data, and not the point-in-time source track data. Thus, target tracks are withdrawn from the data preservation relationship 130 as soon as any application writes to these tracks. Similarly, updates to the source volume after the relationship 130 is established are not part of the point-in-time copy on the target storage device.

In some prior art devices, it is a requirement of the data preservation function that the entire source volume and target volume be involved in the data preservation relationship, even if selected tracks were specified in the data preservation request or command.

FIGS. 2a-2e illustrate one example of another mode of operation of a prior art data preservation function for point-in-time data in connection with a source storage device 200 (FIG. 2a) and a target storage device 210. In this example, the data preservation function establishes a data preservation relationship 230 (FIG. 2b) for a track set of the source storage device 200 and the target storage device 210 without immediately initiating a physical copy of point-in-time data from the source storage device 200 to the target storage device 210. Hence, this mode is referred to as a "no copy" mode. The "no copy" mode of a data preservation function is useful in those applications where space efficiency is emphasized.

In the example of FIGS. 2a-2e, the point-in-time data on the source storage device 200 is stored on source tracks represented by tracks 250a, 250b, 250c. In establishing the relationship 230, a set of space comparable to that occupied by the identified point-in-time data of the source storage device 200, is made available on the target storage device 210 and is of sufficient size such that it can hold on the target storage device 210 the entire set of point-in-time data identified for preservation if need be.

The data preservation function establishes the data preservation relationship 230 for a track set of the source storage device 200 and the target storage device 210 without immediately initiating a physical copy of point-in-time data from the source storage device 200 to the target storage device 210. Hence, the space made available on the target storage device 210 pursuant to the relationship 230 provides space for possible future writes up to the entire set of point-in-time data identified for preservation if need be.

The space made available on the target storage device 210 in association with the relationship 230 is actually used in response to a request to write new data to update old point-in-time data stored on the source storage device 200 and within the relationship 230. If any write activity is initiated to update a portion of the identified set of point-in-time data on the source volume, the write to the source volume is temporarily blocked while that particular old point-in-time data is first transferred to the target volume (FIG. 2c) for preservation ahead of the subsequent update. Thus, in the example of FIG. 2c, a write operation is requested to update the point-in-time data stored on the tracks 250c of the source storage device 200, resulting in a collision. Accordingly, the point-in-time data on tracks 250c is physically copied to tracks 260 of the target volume. After the transfer of that old point-in-time data from source storage device tracks 250c to target storage device tracks 260 completes, the write to the source storage device tracks 250c to update the now copied old data is allowed (FIG. 2d) to complete.

The remaining tracks 250a, 250b of the point-in-time data remain uncopied since they have not been updated to this point. Thus, the point-in-time data physically copied to the target storage device 210 is limited in this mode, to the point-in-time data of the source storage device which was updated.

Figure 3:
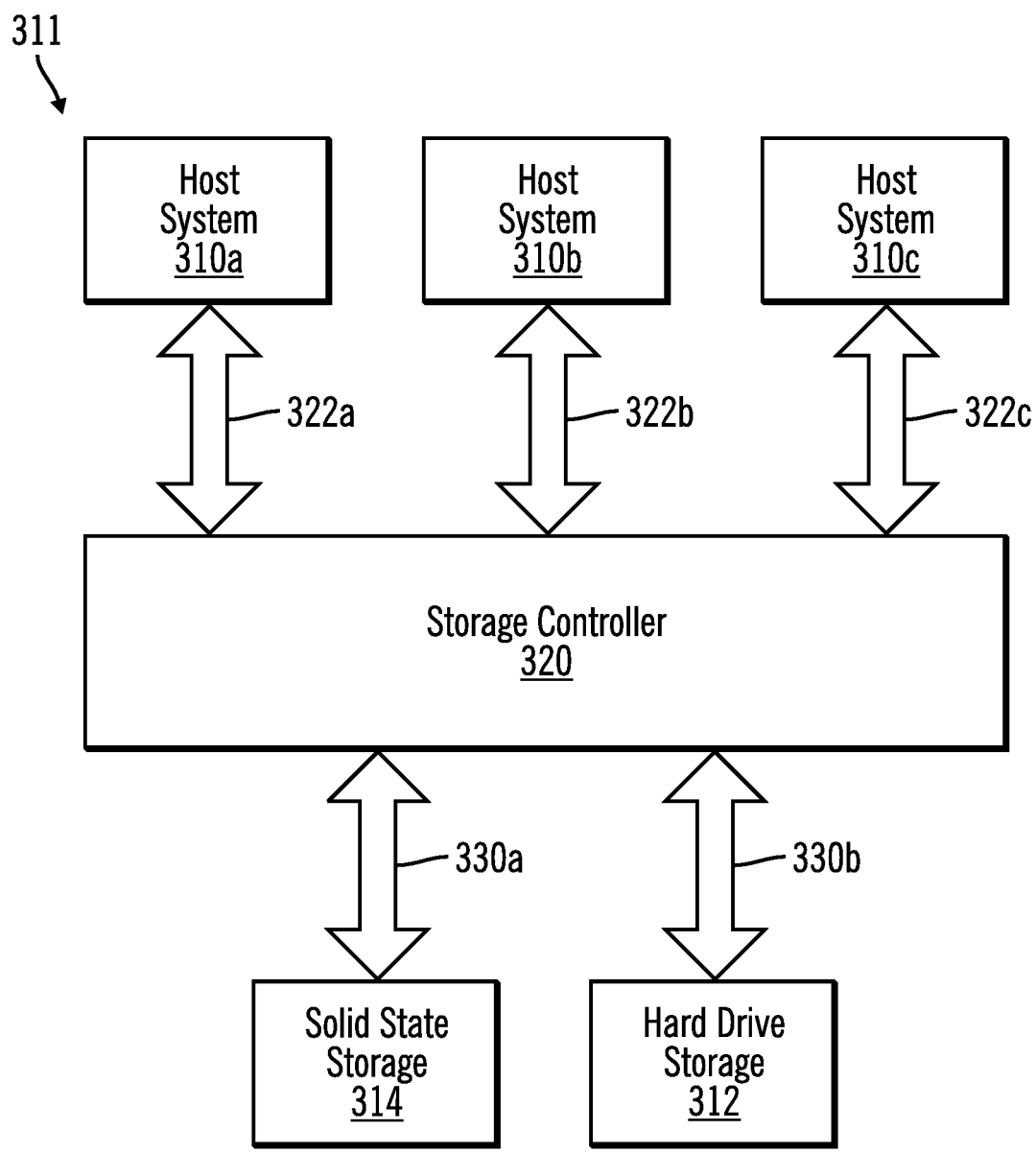
FIG. 3 illustrates an embodiment of a computing environment in which an aspect of the present description may be employed.
Figure 2A:
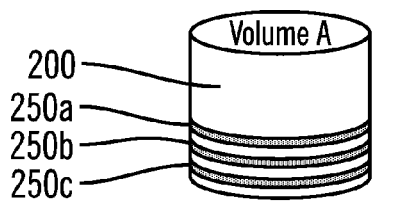
FIGS. 2a-2e illustrate operations of another prior art data preservation function in a "no copy" mode of operation.
Figure 2A:
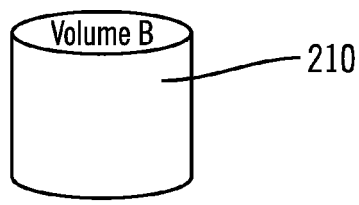
Figure 2B:
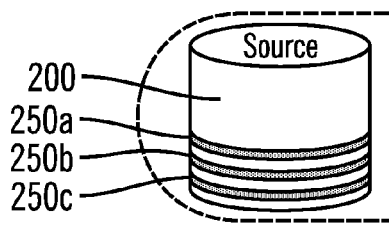
Figure 2B:
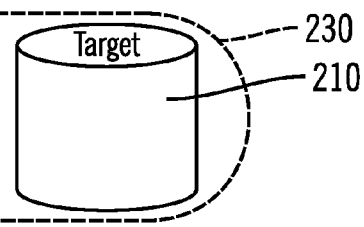
Figure 2C:
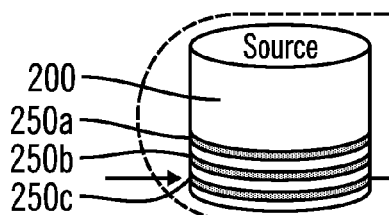
Figure 2C:
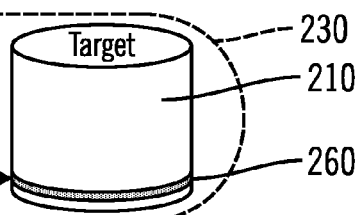
Figure 2D:
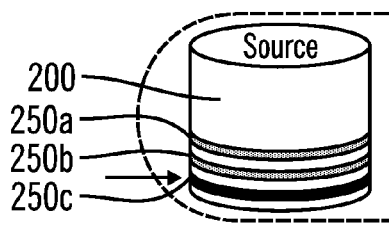
Figure 2D:
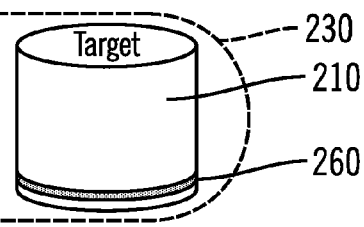
Figure 2E:
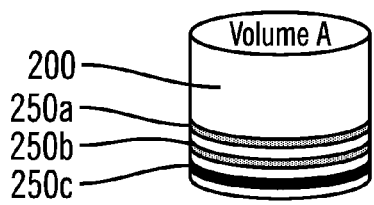
Figure 2E:
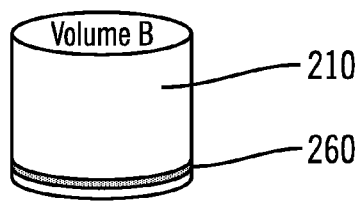

FIG. 3 illustrates an example of a hardware environment in which embodiments in accordance with the present description may be implemented. A plurality of host systems 310a, 310b, 310c are in data communication with a storage area network (SAN) 311 which includes a plurality of storage devices such as hard disk storage 312 and solid state storage 314. The hosts 310a, 310b, 310c communicate with the storage devices 312, 314, via a storage controller 320 of the storage area network 311.

The hard disk storage 312 may include multiple direct access storage devices (DASDs) units for example. The solid state storage 314 may include multiple Flash memory units, for example. In this embodiment, the solid state storage 314 has a substantially faster access time as compared to that of the hard disk drive storage 312. It is appreciated that other types of storage may be used as well including tape drive storage.

The host systems 310a, 310b, 310c may be any suitable host system, such as, for example, a mainframe computer, workstations, etc., including an operating system such as WINDOWS®, AIX®, UNIX®, MVS®, etc. AIX is a registered trademark of IBM; MVS is a trademark of IBM; WINDOWS is a registered trademark of Microsoft Corporation; and UNIX is a registered trademark licensed by the X/Open Company LTD. A plurality of channel paths 322a, 322b, 322c in the host systems 310a, 310b, 310c provide communication paths to the storage controller 320. The storage controller 320 and host systems 310a, 310b, 310c may communicate via any network or communication system known in the art, such as LAN, TCP/IP, ESCON®, SAN, SNA, Fibre Channel, SCSI, etc. ESCON is a registered trademark of International Business Machines Corporation ("IBM"). The host system 310a, 310b, 310c executes commands and receives returned data along a selected channel 322a, 322b, 322c. The storage controller 320 may issue commands to physically position the electromechanical devices to write data to or read data from the hard drive storage 312 via a communication path 330a. The storage controller 320 may also issue commands to write data to or read data from the solid state storage 314 via a communication path 330b.

In accordance with one aspect of the present description, a plurality of maps are provided for a target storage device, in which each map maps extent ranges of the map to corresponding target extent ranges of storage locations on the target storage device. Each map extent range for a particular map extent range of a particular map, can indicate usage of the particular map extent range by a relationship between a source extent range of storage locations on a source storage device containing data to be preserved in the source extent range, and the target extent range mapped to the particular map extent range.

FIGS. 4a-4h show an example of an array 400 of maps which in this embodiment are bitmaps BM1, BM2 . . . BM5 for a volume of a target storage device such as the hard drive storage 312 or solid state storage 314, for example. Each bitmap BM1, BM2 . . . BM5 maps a map extent range to corresponding target extent ranges of tracks 0-150 on the target storage volume. Thus, for example, a map extent range 410a of the bitmap BM1 maps to a corresponding target extent range 0-50 of tracks 0-150 on the target storage volume. In addition, the drawing of the map extent range 410a indicates usage of the particular map extent range 410a by a relationship R1 between a source extent range of storage locations on a source storage device containing data to be preserved in the source extent range, and the target extent range of tracks 0-50 mapped to the particular map extent range 410a.

The particular relationship using a map extent range of a particular bitmap may be identified in any suitable manner. For example, a data structure for the particular relationship may identify the particular bitmap containing the map extent range or ranges being used by that relationship. Alternatively, the relationship identification information may be stored in or with the bitmap. It is appreciated that other techniques may be used depending upon the particular application.

To illustrate operation of the array 400 of bitmaps as depicted in FIGS. 4a-4h, FIG. 5 lists in tabular form one example of a series of events in which relationships are established and withdrawn for a particular source volume and target volume. Relationships may be established in response to a data preservation command identifying a source extent range containing data to be preserved on the source storage device, and identifying a target extent range on the target storage device. Thus, in the example of FIG. 5, the relationship R1 between the source extent range of source tracks 0-50 of the source volume, and the target extent range of target tracks 0-50 of the target volume, is established, and usage of the map extent range 410a corresponding to target extent range of target tracks 0-50, is indicated by the "R1" designation in the drawing of the map extent range 410a of bitmap BM1 of FIG. 4a. Similarly, in response to a data preservation command, the relationship R2 between the source extent range of the source volume tracks 51-100 of the source volume, and the target extent range of the target volume tracks 51-100 of the target volume, is established. Usage of the map extent range 410b of bitmap BM1 is indicated by the "R2" designation in the drawing of the map extent range 410b of bitmap BM1 of FIG. 4a. Likewise, in response to a data preservation command, the relationship R3 between the source extent range of the source volume tracks 101-150 of the source volume, and the target extent range of the target volume tracks 101-150 of the target volume, is established. Usage of the map extent range 410c of bitmap BM1 is indicated by the "R3" designation in the drawing of the map extent range 410c of bitmap BM1 of FIG. 4a.

Figure 4A:
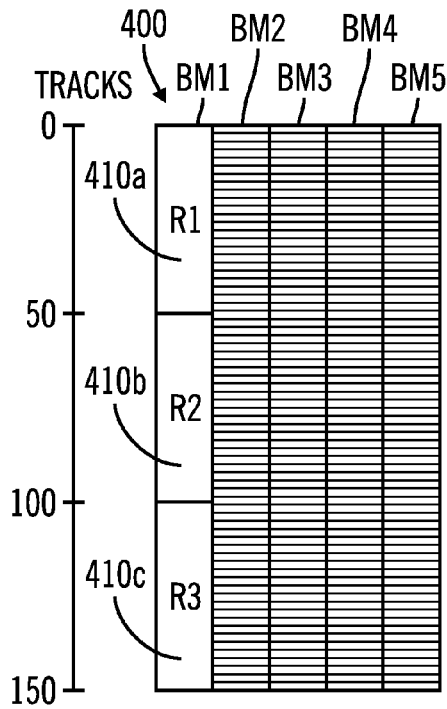

In the example of FIG. 4a, the remaining bitmaps BM2-BM5 associated with the target volume are not yet in use by any relationships. Accordingly, the status of the map extent ranges of the bitmaps BM2-BM5 are depicted as available or unoccupied as indicated by horizontal line hatching in the drawing of FIG. 4a.

Figure 4B:
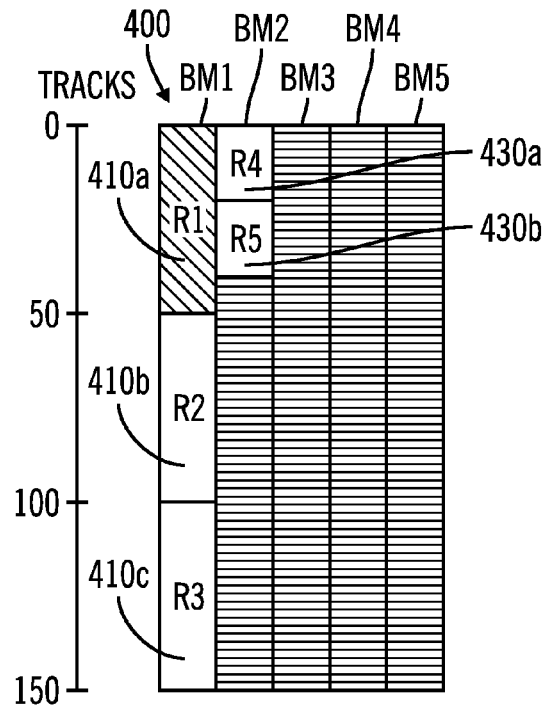

In the example of FIG. 5, following the establishment of relationships R1-R3, the relationship (which is the relationship R1) for target volume tracks 0-50 is subsequently to be withdrawn as shown in FIG. 5. However, before the relationship for target volume tracks 0-50 may be deleted, various clean up operations may need to be performed. For example, in some embodiments, selected data within the target volume tracks 0-50 is to be copied to other target volumes or other target tracks for older relationships that may inherit data from the target volume tracks 0-50 in connection with a data deduplication process, for example. It is appreciated that types of "clean up" operations may cause a delay in deleting a relationship in response to a withdrawal command or following other relationship ending events. Accordingly, if clean up operations are to be performed before a relationship may be deleted, the map extent range 410 may be changed to indicate a "to be deleted" status as shown in FIG. 4b. In the drawing of FIG. 4b, a "to be deleted" status is indicated by diagonal hatching.

The particular state or status of a map extent range (such as "in use", "to be deleted", or "available") may be identified in any suitable manner. For example, the status identification information may be stored in or with the bitmap or in a separate data structure, for example. In one embodiment, a bitmap map extent may indicate one of two states, either available or unavailable (that is, already in use by a relationship which may be either active or to be deleted). In other embodiments, additional states may be indicated such as available, in use by an active relationship, and in use by a "to be deleted" relationship, for example. It is appreciated that other techniques may be used depending upon the particular application.

As previously mentioned, by providing a plurality of maps for a target storage device, in which each map, maps extent ranges of the map to corresponding target extent ranges of storage locations on the target storage device, a new relationship which encompasses tracks of a prior relationship may be initiated before withdrawal of the prior relationship is completed and the prior relationship is deleted. As a consequence, establishment of new relationships may be facilitated.

In another aspect of the present description, in establishing a relationship in response to a data preservation command which identifies a target extent range, the storage system determines whether any map indicates availability of a map extent range mapped to the identified target extent range of the command. If it is determined that a particular map indicates availability of a map extent range mapped to the identified target extent range, the relationship between the identified source extent range and the identified target extent range is established. Furthermore, the usage of the particular map extent range of the particular map by the particular relationship is indicated as described above.

Conversely and in another aspect of the present description, upon determining that no map indicates availability of a map extent range mapped to the identified target extent range of a data preservation command, the establishing of a relationship between source extent range and the target extent range of the command is delayed. Once it is determined that a map indicates availability of a map extent range mapped to the identified target extent range, the requested relationship may be established.

Thus, in the example of FIG. 4b, the map extent ranges 410a, 410b, 410c of bitmap BM1 indicate in FIG. 4b that map extent ranges 410a, 410b, 410c of bitmap BM1 are unavailable for new relationships. More specifically, the "to be deleted" relationship R1 is still using the map extent range 410a which is mapped to target extent range 0-50. In addition, the active or non-withdrawn relationships R2 and R3 are still using the map extent ranges 410b, 410c, respectively, which are mapped to target extent ranges 51-100, 101-150, respectively.

Figure 6:
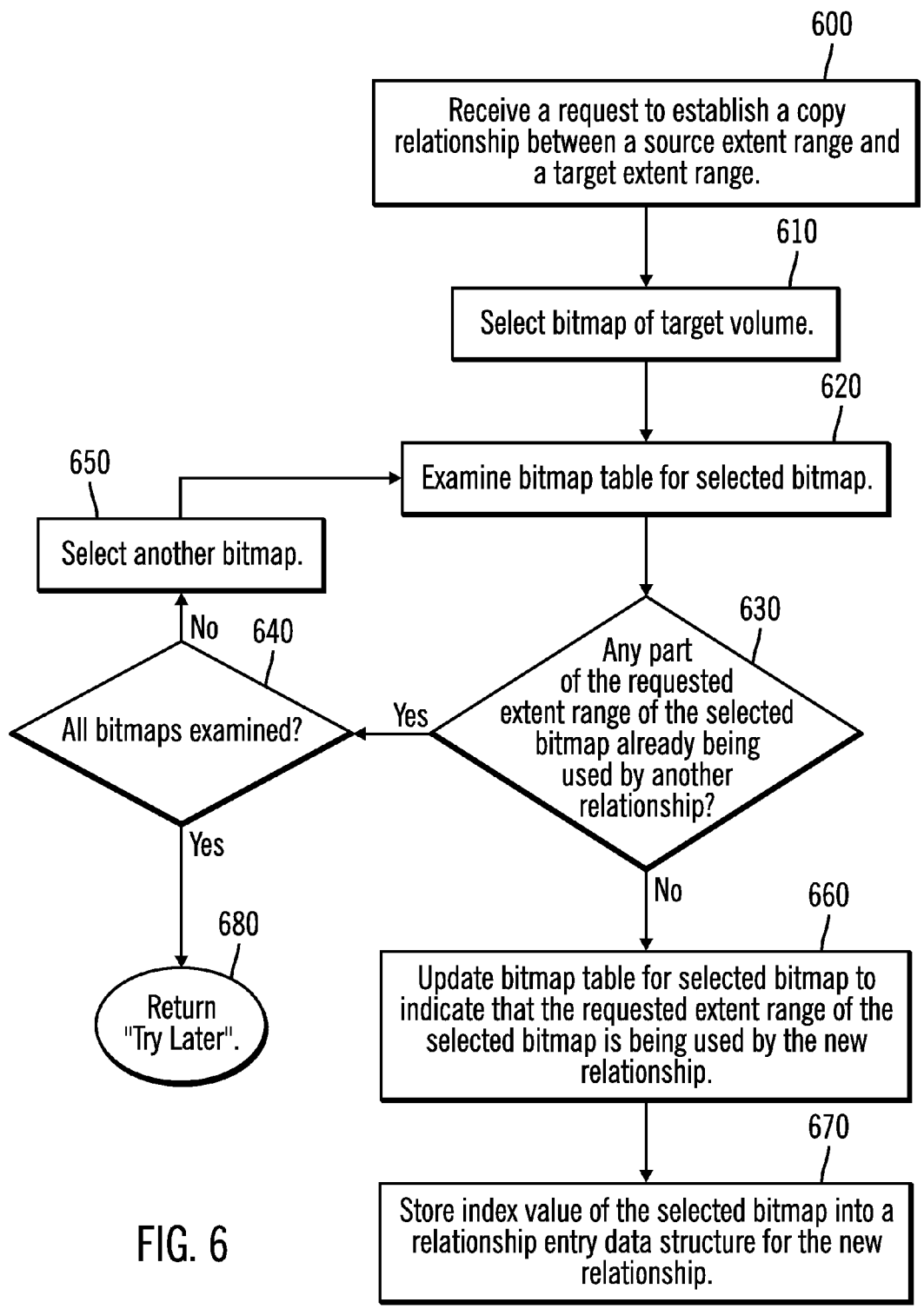
FIG. 6 illustrates an example of operations of a relationship establishing function in accordance with one embodiment of the present description.

FIG. 6 depicts one example of operations of a storage system in accordance with one embodiment of the present description, in which map extent ranges may be examined for availability for use in establishing new relationships. In one operation, in response to a data preservation command, a request is received (block 600) to establish a copy relationship between a source extent range and a target extent range. Thus, following withdrawal of the relationship for target extent range tracks 0-50, the system may receive, for example, a request to establish a new relationship between source extent range tracks 0-20 and target extent range tracks 0-20, designated relationship R4 in FIG. 5.

In response to the request to establish relationship R4, the storage system determines whether any map indicates availability of a map extent range mapped to the target extent range identified by the relationship request. In the embodiment of FIG. 6, the system selects (block 610) a bitmap associated with the target volume. Thus, the system could initially select bitmap BM1, for example.

In another operation, the selected bitmap may be examined (block 620) to determine (block 630) if any part of the requested extent range of the selected bitmap is already being used by another relationship. In the example of FIG. 4b, the map extent range 410a of bitmap BM1 indicates in FIG. 4b that map extent range 410a which includes the map extent range 0-20 is unavailable for new relationships. More specifically, the "to be deleted" relationship R1 is still using the portion of map extent range 410a which is mapped to target extent range 0-20.

Upon determining (block 630) that the selected bitmap is already being used for at least a part of the requested target extent range of the new relationship, a determination (block 640) is made as to whether all the bitmaps associated with the target volume have been examined. If not, another bitmap for the target volume is selected (block 650) and that next bitmap is examined (block 620) in the same manner as the previously selected bitmap BM1. Thus, a determination (block 630) is made as to whether any part of the requested extent range of the selected bitmap is already being used by another relationship.

In the embodiment of FIG. 6, the system may next select (block 650), bitmap BM2, for example. The selected bitmap BM2 may be examined (block 620) to determine (block 630) if any part of the map extent range of the bitmap BM2 corresponding to the requested target extent range 0-20 is already being used by another relationship. In the example of FIG. 4a, the map extent range 430 of bitmap BM2 indicates in FIG. 4a that map extent range 430 of bitmap BM2 which includes the map extent range 0-20 is available for new relationships.

If it is determined that a particular map indicates availability of a map extent range mapped to the identified target extent range of the new relationship request, the new requested relationship between the identified source extent range and the identified target extent range is established. Furthermore, the usage of the particular map extent range of the particular map by the new relationship is indicated. In the embodiment of FIG. 6, the bitmap table is updated (block 660) for the selected bitmap to indicate that the requested map extent range of the selected bitmap is being used by the new relationship. Thus, in this example, the bitmap BM2 is updated in FIG. 4b to indicate usage of the map extent range tracks 0-20 of the map extent range 430a of the bitmap BM2, by the new relationship R4.

Figure 7:
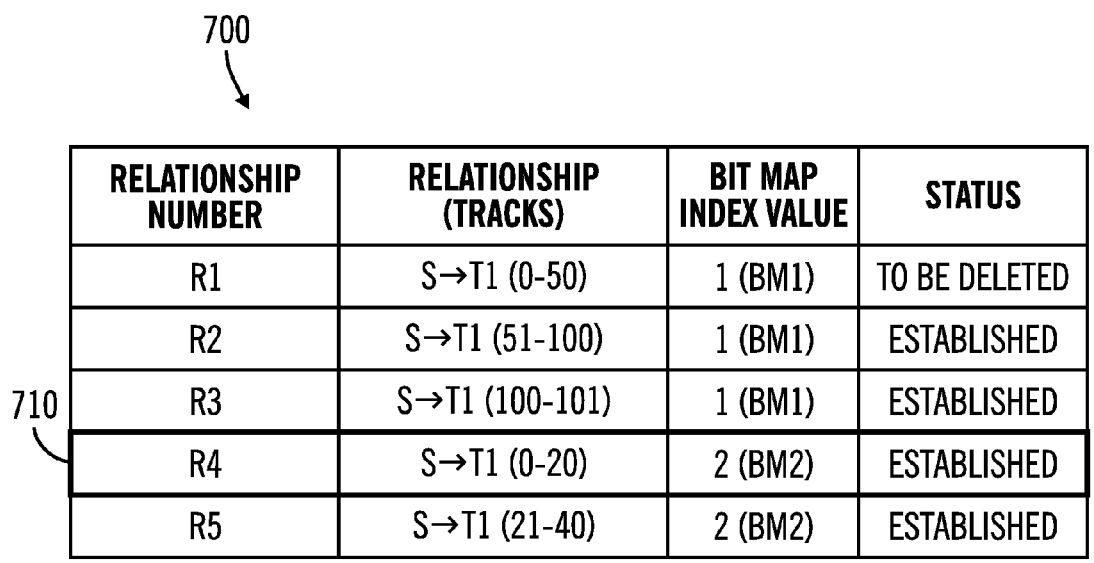
FIG. 7 illustrates an example of data structures for use with operations of a relationship establishing function in accordance with one embodiment of the present description.

In addition, an index value of the selected bitmap may be stored (block 670) in a relationship entry data structure for the new relationship. Thus, in this example, an index value of "2", for example, for the selected bitmap BM2, may be stored (block 670) in a relationship entry 710 (FIG. 7) of a table 720 of relationship data structures, for the new relationship R4, to identify that the relationship R4 is using bitmap BM2. FIG. 7 also depicts data structures for the relationships R1, R2, R3 discussed above, which indicate that relationships R1, R2, R3 are using bitmap BM1 as discussed above and depicted in FIGS. 4a, 4b.

Thus, it is seen from the above example that although the clean up operation involving relationship R1 has not yet completed, a new relationship, R4, may be established for a target extent range which includes some or all of the target extent range associated with the prior relationship R1 which is in the process of being withdrawn but not yet deleted. Accordingly, the new relationship R4 may be established without waiting for the prior withdrawn relationship R1 to be deleted.

In the example of FIG. 5, the next event is a request to establish relationship R5 for target extent range tracks 21-40. In the same manner as described above, a map extent range in bitmap BM2 for target extent range tracks 21-40 is identified as available (FIG. 4a) and thus the bitmap BM2 is updated in FIG. 4b to indicate usage of the map extent range tracks 21-40 of the map extent range 430b of the bitmap BM2, by the new relationship R5. A data structure for the relationship R5 may also be updated to indicate that the relationship R5 is using the bitmap BM2.

Figure 8:
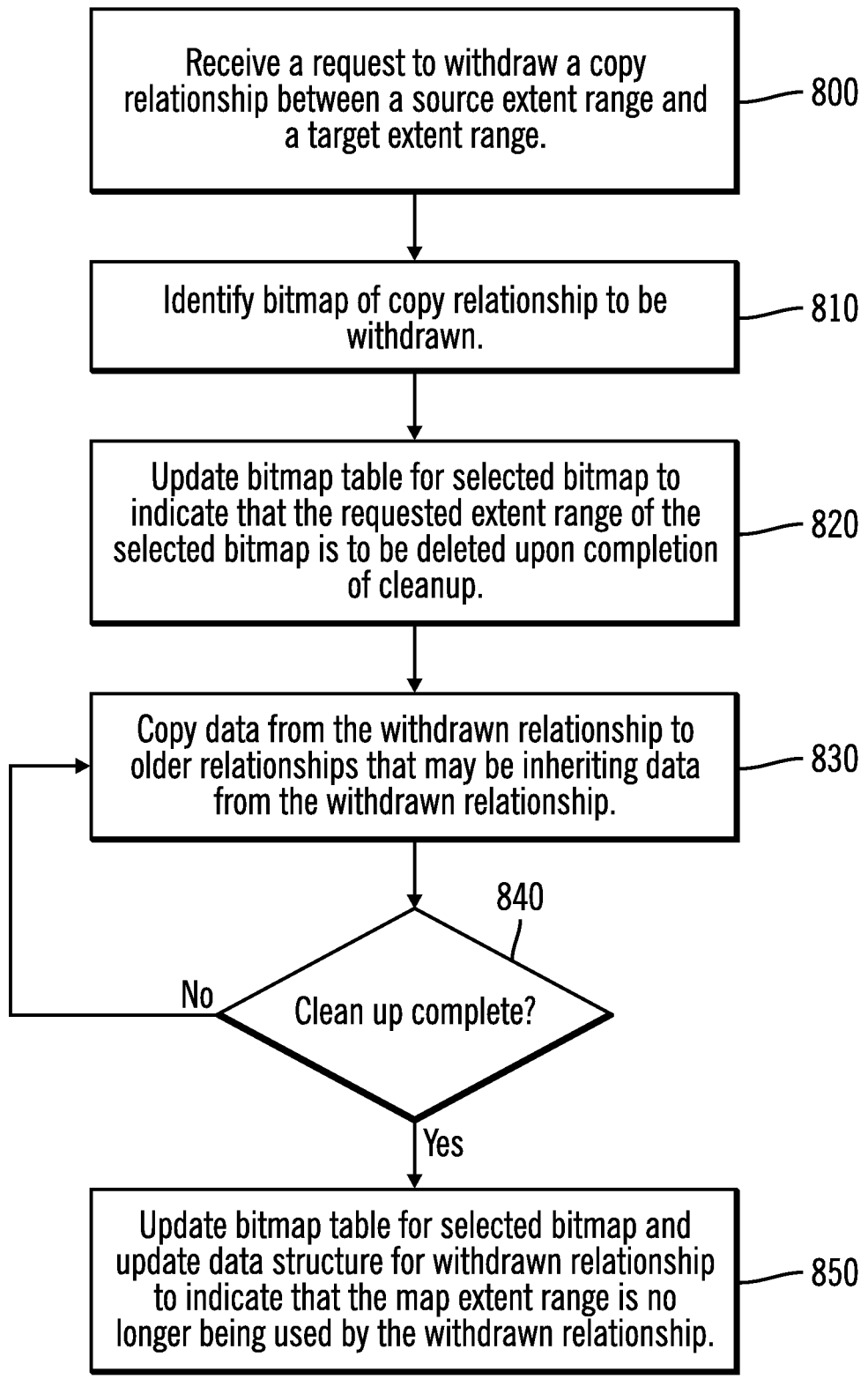
FIG. 8 illustrates an example of operations of relationship withdrawal and deletion functions in accordance with one embodiment of the present description.

The next event (FIG. 5) is a request to withdraw the relationship for target extent range tracks 51-150. FIG. 8 depicts one embodiment of operations of a storage system for withdrawing relationships between a source volume and a target volume. In a first operation, a request to withdraw a relationship between a source extent range and a target extent range is received (block 800). In another operation, the bitmap for the relationship to be withdrawn is identified (block 810). In one embodiment, the bitmap may be identified by examining the data structures of the table 700 (FIG. 7), for example. Thus, in the example in which a request is received to withdraw the relationship for target extent range tracks 51-150, table 700 indicates that bitmap BM1 is being used by relationships R2 and R3 for target extent range tracks 51-150.

Alternatively, the bitmap may be identified by examining the bitmap table of FIG. 4b, for example. Thus, in the example in which a request is received to withdraw the relationship for target extent range tracks 51-150, the bitmap table indicates that bitmap BM1 is being used by relationships R2 and R3 for target extent range tracks 51-150.

In another operation, the bitmap table for the identified bitmap is updated (block 820) to indicate that the requested extent range of the identified bitmap is to be deleted upon completion of the clean up operation. Thus, in the example in which the bitmap BM1 is indicated to being used by relationships (here, relationships R2 and R3) for target extent range tracks 51-150, the bitmap BM1 is updated to indicate that the relationships (here, relationships R2 and R3) for target extent range tracks 51-150 are "to be deleted" as indicated by the diagonal hatching of map extent ranges 410b, 410c in FIG. 4c.

As previously noted, in some embodiments, before a relationship for target volume tracks may be deleted, various clean up operations are to be performed. For example, in some embodiments, selected data within the target extent range tracks may be copied (block 830) to other target volumes or other target tracks for older relationships that may inherit data from target extent range tracks. Until it is determined (block 840) that any clean up operation has completed, the clean up operation continues (block 830).

Figure 4C:
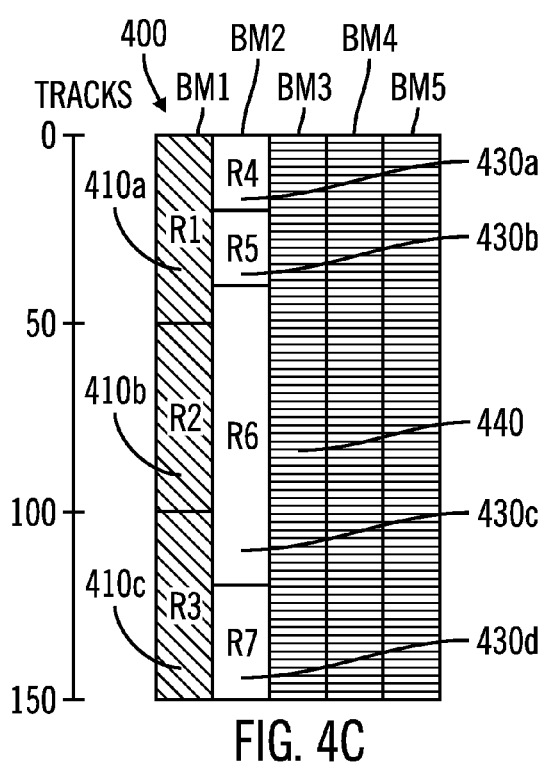

The operations of the storage system continue in accordance with the description above for the subsequent events of FIG. 5. Thus, FIG. 4c shows that in response to requests for establishment of relationships R6, R7 for target extent range tracks 41-130, 131-150, respectively, bitmap BM2 is determined to have available (FIG. 4b) map extent ranges for target extent range tracks 41-130, 131-150, respectively, and accordingly, map extent ranges 430c and 430d, respectively, for bitmap BM2 are updated (FIG. 4c) to indicate usage of those map extent ranges 430c and 430d of bitmap BM2 by relationships (here, relationships R6, R7, respectively). In addition, data structures for relationships R6, R7 are updated to indicate that the relationships R6, R7 are using bitmap BM2.

Figure 4D:
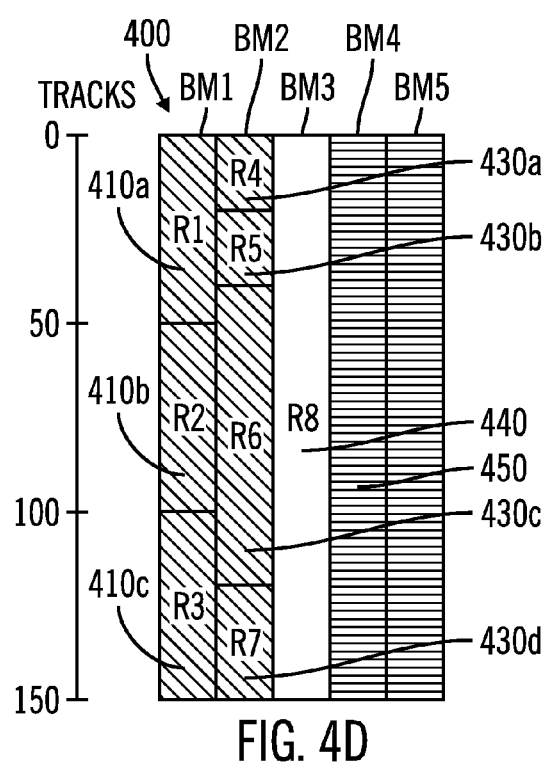

FIG. 4d shows that in response to a request to withdraw the relationships for target extent range tracks 0-150, the bitmap BM2 is identified as being used by the relationships R4-R7 for target extent range tracks 0-150, and the bitmap table for the identified bitmap BM2 is updated to indicate that the relationships (here, relationships R4-R7) for BM2 map extent ranges mapped to target extent range tracks 0-150 are "to be deleted" as indicated by the diagonal hatching of map extent ranges 430a-430d in FIG. 4d.

FIG. 4d further shows that in response to a request for establishment of relationship R8 for target extent range tracks 0-150, bitmap BM3 is determined to have available (FIG. 4c) map extent range 440 for target extent range tracks 0-150, and accordingly, map extent range 440, for bitmap BM3 is updated (FIG. 4d) to indicate usage of that map extent range 440 of bitmap BM3 by a relationship (here, relationship R8). In addition, data structures for relationship R8 are updated to indicate that the relationship R8 is using bitmap BM3.

FIG. 4e shows that in response to a subsequent request to withdraw the relationships for target extent range tracks 0-150, the bitmap BM3 is identified as being used by the a relationship (here, relationship R8) for target extent range tracks 0-150, and the bitmap table for the identified bitmap BM3 is updated to indicate that the relationship (here, relationship R8) for target extent range tracks 0-150 is "to be deleted" as indicated by the diagonal hatching of map extent range 440 in FIG. 4e.

FIG. 4e further shows that in response to a request for establishment of relationships R9-R12 for target extent range tracks 0-150 (collectively) bitmap BM4 is determined to have available (FIG. 4d) map extent range 450 for target extent range tracks 0-150, and accordingly, map extent ranges 450a, 450b, 450c, 450d for bitmap BM4 are updated (FIG. 4e) to indicate usage of those map extent ranges of bitmap BM4 by relationships (here, relationships R9-R12). In addition, data structures for relationships R9-R12 are updated to indicate that the relationships R9-R12 are using bitmap BM4.

FIG. 4f shows the bitmap BM4 updated to indicate that the relationships (here, relationships R9-R12) for target extent range tracks 0-150 are "to be deleted" as indicated by the diagonal hatching of map extent range 450a, 450b, 450c, 450d, in response to a request to withdraw the relationships for target extent range tracks 0-150. Bitmap BM5 of FIG. 4f shows usage of that bitmap by relationships (here relationships R13-R14) which were subsequently withdrawn as well and are to be deleted as indicated by the diagonal hatching of map extent ranges 460a, 460b of bitmap BM5 in FIG. 4f.

In the example of FIG. 5, the next event (following the withdrawal of the relationships R13-R14) is a request to establish relationship R15 for target extent range tracks 0-100. In the same manner as described above, the bitmaps BM1-BM5 are examined to determine if any of the bitmaps has an available map extent range which includes the target extent range tracks 0-100. However, as shown in FIG. 4f, although all of the prior relationships have been withdrawn, no bitmap is available because the relationships using those bitmaps have not yet been deleted. If it is determined (block 640, FIG. 6) that all bitmaps are unavailable for the requested target extent range, a "try later" is returned (block 680, FIG. 6).

As previously noted, before a relationship for target volume tracks may be deleted, various clean up operations may need to be performed. For example, in some embodiments, selected data within the target extent range tracks may be copied (block 830, FIG. 8) to other target volumes or other target tracks for older relationships that may inherit data from target extent range tracks. If it is determined (block 840) that the clean up operation for a particular relationship has not completed, the clean up operation is permitted to continue (block 830).

However, once it is determined (block 840) that the clean up operation has completed for a relationship being withdrawn, the relationship may be deleted. Hence, the bitmap and data structure tables may be updated (block 850) for the selected bitmap for that relationship to indicate that the map extent range corresponding to the target extent range of the withdrawn relationship is no longer being used by the withdrawn and now deleted relationship. Thus, if clean-up operations for relationships R1-R2 have completed, the map extent range 410d of bitmap BM1 for target extent range tracks 1-100 may be updated to indicate that the map extent range 410d (which combines map extent ranges 410a, 410b) is available for use by another relationship, as indicated by the horizontal hatching in FIG. 4g. In addition, the data structures for the relationships R1-R2 may be updated to indicate that the relationships R1-R2 are no longer using the bitmap BM1.

In the example of FIG. 5, the next event is a retry of the request to establish relationship R15 for target extent range tracks 0-100. In the same manner as described above, the bitmaps BM1-BM5 are examined to determine if any of the bitmaps has an available map extent range which includes the target extent range tracks 0-100. As noted above, the map extent range 410d of bitmap BM1 for target extent range tracks 1-100 has been subsequently updated to indicate that the map extent range 410d is available for use by another relationship, as indicated by the horizontal hatching in FIG. 4g. Hence, FIG. 4h shows that in response to the retry of the request for establishment of relationship R15 for target extent range tracks 0-100, bitmap BM1 is determined to have available (FIG. 4g) map extent range 410d for target extent range tracks 0-100, and accordingly, map extent range 410d, for bitmap BM1 is updated (FIG. 4h) to indicate usage of that map extent range 410d of bitmap BM1 by relationship R15. In addition, data structures for relationship R15 are updated to indicate that the relationship R15 is using bitmap BM1.

As operations continue additional clean up operations may complete permitting the associated relationships to be deleted. Accordingly, the bitmap table may be updated (block 850) for the selected bitmap for the deleted relationship, to indicate that the map extent range corresponding to the target extent range of the withdrawn and now deleted relationship is no longer being used by that deleted relationship. Thus, once clean-up operations for relationships R5 and R7 have completed, for example, the map extent ranges 430b and 430d of bitmap BM2 for target extent range tracks 0-40 and 131-150, respectively may be updated to indicate that the map extent ranges 430b and 430d of bitmap BM2 are available for use by another relationship, as indicated by the horizontal hatching in FIG. 4h. In addition, the data structures for the relationships R5 and R7 may be updated to indicate that the relationships R5 and R7 are no longer using the bitmap BM2.

In the illustrated embodiment, five bitmaps BM1-BM5 are depicted for use with a target volume. However, it is appreciated that the number of bitmaps may vary, depending upon the particular application. Thus, for example, in some embodiments, eight bitmaps may be used. It is appreciated that in some embodiments, a greater number of bitmaps may permit establishment of more relationships, yet may delay clean up operations following withdrawal of relationships.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, interconnected storage devices, an array of storage devices, multiple memory or storage devices or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In certain embodiments, the system of FIG. 3 may be implemented as a cloud component part in a cloud computing environment. In the cloud computing environment, the systems architecture of the hardware and software components involved in the delivery of cloud computing may comprise a plurality of cloud components communicating with each other over a network, such as the Internet. For example, in certain embodiments, the system of FIG. 3 may provide clients, and other servers and software and/or hardware components in the networked cloud, with scheduling services.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 6, 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product, for use with a host, a storage controller and source and target storage devices having extent ranges, the computer program product comprising a non-transitory computer readable storage medium having computer readable program code embodied therein that executes to perform operations, the operations being in the storage controller, the operations comprising: mapping in a plurality of maps for a target storage device, map extent ranges of each map, to corresponding target extent ranges of storage locations on the target storage device; indicating for a particular map extent range of a particular map, that the particular map extent range of the particular map is available for the establishment of a relationship between a source extent range of storage locations on a source storage device containing data to be preserved in the source extent range, and the target extent range mapped to the map particular extent range; receiving a data preservation command identifying a source extent range containing data to be preserved on the source storage device, and identifying a target extent range on the target storage device; and in response to the command, performing a data preservation operation including: determining whether a map indicates availability of a map extent range mapped to the identified target extent range; and upon determining that a particular map indicates availability of a map extent range mapped to the identified target extent range, establishing a relationship between the identified source extent range and the identified target extent range; wherein said indicating further includes indicating usage of the particular map extent range of the particular map by the relationship; and storing in a data structure for the relationship, an identification of the particular map which indicates usage of the particular map extent range of the particular map by the relationship.

2. The computer program product of claim 1, wherein the operations further comprise:
   upon determining that no map indicates availability of a map extent range mapped to the identified target extent range, delaying establishing a relationship between the identified source extent range and the identified target extent range until it is determined that a particular map indicates availability of a map extent range mapped to the identified target extent range.

3. The computer program product of claim 1 wherein the operations further comprise:
   withdrawing the relationship;
   copying data within the identified target extent range of the withdrawn relationship, to older relationships inheriting the data being copied.

4. The computer program product of claim 3 wherein the operations further comprise:
   upon completion of the copying of data within the identified target extent range of the withdrawn relationship, to older relationships inheriting the data being copied, indicating for the particular map extent range of the particular map, availability of the particular map extent range for usage by another relationship between a source extent range of storage locations on a source storage device containing data to be preserved in the source extent range, and the target extent range of the withdrawn relationship.

5. A system for use with a host, comprising:
   source and target storage devices having extent ranges; and
   a storage controller adapted to control the source and target storage devices, said storage controller including a processor which is adapted to perform operations including:
      mapping in a plurality of maps for a target storage device, map extent ranges of each map, to corresponding target extent ranges of storage locations on the target storage device;
      indicating for a particular map extent range of a particular map, that the particular map extent range of the particular map is available for the establishment of a relationship between a source extent range of storage locations on a source storage device containing data to be preserved in the source extent range, and the target extent range mapped to the map particular extent range
      receiving a data preservation command identifying a source extent range containing data to be preserved on the source storage device, and identifying a target extent range on the target storage device;
      in response to the command, performing a data preservation operation including:
         determining whether a map indicates availability of a map extent range mapped to the identified target extent range; and
         upon determining that a particular map indicates availability of a map extent range mapped to the identified target extent range, establishing a relationship between the identified source extent range and the identified target extent range;
         wherein said indicating further includes indicating usage of the particular map extent range of the particular map and
      storing in a data structure for the relationship, an identification of the particular map which indicates usage of the particular map extent range of the particular map by the relationship.

6. The system of claim 5, wherein the operations further comprise:
   upon determining that no map indicates availability of a map extent range mapped to the identified target extent range, delaying establishing a relationship between the identified source extent range and the identified target extent range until it is determined that a particular map indicates availability of a map extent range mapped to the identified target extent range.

7. The system of claim 5 wherein the operations further comprise:
   withdrawing the relationship;
   copying data within the identified target extent range of the withdrawn relationship, to older relationships inheriting the data being copied.

8. The system of claim 7 wherein the operations further comprise:
   upon completion of the copying of data within the identified target extent range of the withdrawn relationship, to older relationships inheriting the data being copied, indicating for the particular map extent range of the particular map, availability of the particular map extent range for usage by another relationship between a source extent range of storage locations on a source storage device containing data to be preserved in the source extent range, and the target extent range of the withdrawn relationship.

* * * * *